US010343141B1

(12) United States Patent
Nenoff et al.

(10) Patent No.: US 10,343,141 B1
(45) Date of Patent: Jul. 9, 2019

(54) COMPOSITIONS, SYSTEMS AND METHODS USING SELECTIVE POROUS MATERIALS FOR OXYGEN SEPARATION

(71) Applicant: Sandia Corporation, Albuquerque, NM (US)

(72) Inventors: Tina M. Nenoff, Albuquerque, NM (US); Dorina Florentina Sava Gallis, Albuquerque, NM (US); Marie Vernell Parkes, Albuquerque, NM (US); Jeffery A. Greathouse, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 28 days.

(21) Appl. No.: 15/269,745

(22) Filed: Sep. 19, 2016

Related U.S. Application Data

(60) Provisional application No. 62/220,549, filed on Sep. 18, 2015, provisional application No. 62/325,833, filed on Apr. 21, 2016.

(51) Int. Cl.
*B01D 53/02* (2006.01)
*B01J 20/22* (2006.01)
*B01D 53/04* (2006.01)

(52) U.S. Cl.
CPC ............ *B01J 20/226* (2013.01); *B01D 53/04* (2013.01); *B01D 2253/204* (2013.01); *B01D 2257/104* (2013.01)

(58) Field of Classification Search
CPC .. B01J 20/226; B01D 53/04; B01D 2253/204; B01D 2257/104
See application file for complete search history.

(56) References Cited

U.S. PATENT DOCUMENTS

| | | | | |
|---|---|---|---|---|
| 6,491,740 B1* | 12/2002 | Wang | ..................... | B01D 53/02 502/400 |
| 2010/0043636 A1* | 2/2010 | Hwang | ................ | B01J 31/1691 95/127 |
| 2011/0159116 A1* | 6/2011 | Reynolds | ............... | A61K 33/00 424/718 |
| 2012/0077092 A1* | 3/2012 | Lee | ........................ | C08J 5/2206 429/307 |
| 2014/0212944 A1* | 7/2014 | Tian | ....................... | B82Y 30/00 435/180 |
| 2014/0294709 A1* | 10/2014 | Long | ..................... | B01D 53/62 423/228 |
| 2015/0094202 A1* | 4/2015 | Dolan | .................... | F17D 5/005 502/401 |

(Continued)

OTHER PUBLICATIONS

Block, E. et al., "Selective Binding of O2 over N2 in a Redox-Active Metal Organic-Framework with Open Iron(II) Coordination Sites" Journal of the American Chemical Society, 2011, pp. 14814-14822, vol. 133.

(Continued)

*Primary Examiner* — Christopher P Jones
(74) *Attorney, Agent, or Firm* — Daniel J. Jenkins

(57) ABSTRACT

MOFs are disclosed that can efficiently adsorb oxygen from a gas stream, such as air. Systems and methods are also disclosed that utilize MOFs to separate oxygen from a gas stream. The separated oxygen may be used in a commercial process such as a combustion process.

7 Claims, 11 Drawing Sheets

(56) References Cited

U.S. PATENT DOCUMENTS

| | | | | |
|---|---|---|---|---|
| 2015/0273401 | A1* | 10/2015 | Miller | B01D 67/0037 |
| | | | | 210/500.25 |
| 2015/0291870 | A1* | 10/2015 | Van Horn | C09K 5/047 |
| | | | | 252/69 |
| 2016/0013515 | A1* | 1/2016 | Lee | H01M 4/134 |
| | | | | 429/126 |
| 2016/0060434 | A1* | 3/2016 | Reinicker | C08K 5/0091 |
| | | | | 524/398 |
| 2016/0176070 | A1* | 6/2016 | James | C07F 15/06 |
| | | | | 546/7 |
| 2016/0231233 | A1* | 8/2016 | Wang | G01N 21/3504 |
| 2017/0145299 | A1* | 5/2017 | Schultheiss | C09K 8/80 |
| 2017/0350225 | A1* | 12/2017 | Benoit | E21B 47/0905 |

OTHER PUBLICATIONS

Murray, L. et al., "Highly-Selective and Reversible O2 Binding in Cr3(1,3,5-benzenetricarboxylate" Journal of the American Chemical Society, 2010, pp. 7856-7857, vol. 132.

Parkes, M. et al., "Effect of Metal in M3(btc)2 and M2(dobdc) MOFs for O2/N2 Separations: A Combined Density Functional Theory and Experimental Study", The Journal of Physical Chemistry, 2015, pp. 6556-6567, vol. 119.

Parkes, M. et al., "Ab initio molecular dynamics determination of competitive O2 vs. N2 adsorption at open metal sites of M2(dobdc)", Phys. Chem. Chem. Phys., 2016, pp. 11528-11538, vol. 18.

Sava Gallis, D. et al., "Enhanced O2 Selectivity versus N2 by Partial Metal Substitution in Cu-BTC", Chemical of Materials, 2015, pp. 2018-2225, vol. 27.

Sava Gallis, D. et al., "Selective O2 Sorption at Ambient Temperatures via Node Distortions in Sc-MIL-100", Chemistry of Materials, 2016, pp. 3327-3336, vol. 28.

Southon, P. et al., "Reversible and Selective O2 Chemisorption in a Porous Metal—Organic Host Material", Journal of the American Chemical Society, 2011, pp. 10885-10891, vol. 133.

Verma, P. et al., "Identifying the Interactions That Allow Separation of O2 from N2 on the Open Iron Sites of Fe2(dobdc)", Journal of Physical Chemistry C, 2015, pp. 28499-28511, vol. 119.

Xiao, D. J. et al., "Selective, Tunable O2 Binding in Cobalt(II)-Triazolate/Pyrazolate Metal-Organic Frameworks", Journal of the American Chemical Society, 2016, pp. 7161-7170, vol. 138.

Yang, J. et al., "Protection of open-metal V(III) sites and their associated CO2/CH4/N2/O2/H2O adsorption properties in mesoporous V-MOFs", Journal of Colloid and Interface Science, 2015, pp. 197-205, vol. 456.

Zhang, W. et al., "Redox-Active Metal-Organic Composites for Highly Selective Oxygen Separation Applications", Advanced Materials, 2016, pp. 3572-3577, vol. 28.

* cited by examiner

COMPOSITIONS, SYSTEMS AND METHODS USING SELECTIVE POROUS MATERIALS FOR OXYGEN SEPARATION

CROSS-REFERENCE TO RELATED APPLICATIONS

This application claims priority to provisional patent applications U.S. Ser. No. 62/220,549, entitled "COMPOSITIONS, SYSTEMS AND METHODS FOR SELECTIVE POROUS MATERIAL O2 SEPARATION," by Nenoff et al., filed Sep. 18, 2015, and provisional patent applications U.S. Ser. No. 62/325,833, entitled "COMPOSITIONS, SYSTEMS AND METHODS FOR SEPARATING OXYGEN FROM AIR AT AMBIENT TEMPERATURES," by Nenoff et al., filed Apr. 21, 2016, the disclosures of which is incorporated herein by reference in their entireties.

GOVERNMENT RIGHTS

The Government has rights to this invention pursuant to Contract No. DE-AC04-94AL85000 awarded by the U.S. Department of Energy.

FIELD

The invention relates generally to gas separation and more particularly to materials that selectively separate oxygen from air.

BACKGROUND OF THE INVENTION

Purified $O_2$ streams are utilized in many sectors of the industrial economy, including combustion, steel production, glass and cement production, petrochemical processing, metallurgy, pulp and paper production, and biochemical processing and waste treatment. For example, purified $O_2$ streams are used in oxy-fuel combustion to improve the heat transfer associated with stationary energy processes. In 2003, total shipments of purified $O_2$ amounted to nearly 26 million tons, a value of approximately $1 billion, requiring over five million MWh of energy to produce.

However, pure oxygen ($O_2$) generation's overall penetration into industrial and power markets is constrained by the high cost of existing air separation technologies. Cryogenic air separation is the most widely used technology for generating large flows of oxygen but is a complex and expensive technology. Currently, for a 600 MWe (gross) oxy-fuel power plant using cryogenic air separation, 100 MWe will be consumed by air-separation, resulting in an efficiency decrease of 10 percentage points. Pressure swing adsorption (PSA) is a competing technology that uses separations materials such as activated carbon, zeolites and polymer membranes. Current PSA technology is expensive and limited to moderate purity $O_2$ applications because of limitations of existing separations materials. For current zeolite-based PSA processes, capital costs (primarily adsorption vessels and compressors) and operating costs (primarily energy costs) each represent approximately 50% of the total cost of air separation. There have been no significant breakthroughs in air separation technologies for several decades.

Technology is needed to reduce the expense and increase purity in $O_2$ separation technology.

SUMMARY OF THE INVENTION

According to an embodiment of the disclosure, a composition is disclosed having the formula m/Cu-BTC, where BTC=benzene-1,3,5-tricarboxylic acid and m/Cu represents partial substitution of Cu with a metal ion (m) selected from a group consisting Sc, Ti, V, Mn, Fe and Co.

According to another embodiment of the disclosure, a process is disclosed that includes contacting a gas stream containing oxygen at a first concentration with a metal-organic framework material having the formula m/Cu-BTC, where BTC=benzene-1,3,5-tricarboxylic acid and m/Cu represents partial substitution of Cu with a metal ion (m) selected from a group consisting Sc, Ti, V, Mn, Fe and Co at a first temperature and first pressure to adsorb oxygen from the gas stream into the metal-organic framework, and desorbing oxygen from the metal-organic framework material at a second temperature and a second pressure.

According to another embodiment of the disclosure, a process is disclosed that includes contacting a gas stream containing oxygen at a first concentration with a metal-organic framework material having the formula m-(1,3,5-BTC), where BTC=Benzene-1,3,5-$C_6H_3(CO_2H)_3$, and where m=Sc, Ti and V, at a first temperature and first pressure to adsorb oxygen from the gas stream into the metal-organic framework; and desorbing oxygen from the metal-organic framework material at a second temperature and a second pressure.

According to another embodiment of the disclosure, a process is disclosed that includes contacting a gas stream containing oxygen at a first concentration with a metal-organic framework material having the formula Eu(TTB)(DEF)($H_2O$).(DEF)$_5$, where TTB is 3,3 0,4,4 0-tetra (trimethylsilylethynyl)biphenyl, and DEF is N,N'-diethylformamide at a first temperature and first pressure to adsorb oxygen from the gas stream into the metal-organic framework; and desorbing oxygen from the metal-organic framework material at a second temperature and a second pressure.

An object of the present disclosure is to disclose novel materials having improved $O_2$ sorption selectivity.

Another object of the present disclosure is to reduce the expense and increase purity in $O_2$ separation technology by the use of highly selective O2 adsorption materials to perform $O_2$ separations under mild conditions of low pressure and temperature.

Another object of the present disclosure is to disclose selective adsorption material-based separation technology, with improved capacity and competitive (or better) selectivity than zeolites, that dramatically reduce energy intensity, greenhouse gas footprint, and costs (anticipated reduction of 50%=2.5 million MWh of energy) over existing purified $O_2$ streams.

Another object of the present disclosure is to utilize selective adsorption materials for gas separations at ambient pressure and room temperature, potentially revolutionizing the PSA process and providing dramatic process efficiency improvements through oxy-fuel combustion.

An advantage of the present disclosure is reduced expense and increased purity in $O_2$ separation technology.

Another advantage of the present disclosure is to reduce the $CO_2$ and energy footprint of stationary energy production facilities.

Another advantage of the present disclosure is the use of materials having improved capacity and competitive (or better) selectivity than zeolites, which will dramatically reduce energy intensity, greenhouse gas footprint, and costs over existing purified $O_2$ streams, expanding the market for non-cryogenic produced $O_2$.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

DETAILED DESCRIPTION OF THE INVENTION

The present disclosure is directed to new materials that have high selectivity for $O_2$ adsorption from a gas stream containing $O_2$. The present disclosure is further directed to new processes for sorbing $O_2$ from a gas stream containing $O_2$. In an embodiment, the gas stream may be air.

The new materials according to this disclosure include partially substituted, activated Cu-BTC. Cu-BTC is also known as HKUST-1 or $Cu_2(BTC)_3$, but will be referred to herein afterwards as Cu-BTC, where BTC=benzene-1,3,5-tricarboxylic acid. The partially substituted, activated Cu-BTC (represented by m/Cu-BTC) may be partially substituted by one or more metals selected from a group including Sc, Ti, V, Mn, Fe and Co. For example, Sc may be selected to form Sc/Cu-BTC.

The present invention is further directed to new processes that use one or more materials selected from a group including SMOF-7, m/Cu-BTC, where m=Sc, Ti, V, Mn, Fe and Co and m-MIL-100, where m=Sc, Ti and V.

SMOF-7 as an oxygen sorption material

SMOF-7 is a MOF material with tortuous porosity pathways and crystalline defined pores. SMOF-7 has now been determined to have high selectivity for $O_2$ over $N_2$. It is a crystalline metal-organic porous material with Eu metal centers and TTB organic ligands. It has a 7×4.4 Å pore diameter, an effective 5.1 Å pore opening and a specific surface area of between 7-17 $m^2/g$. SMOF-7 is Eu(TTB)(DEF)($H_2O$).(DEF)$_5$, where TTB is 3,3 0,4,4 0-tetra (trimethylsilylethynyl)biphenyl, and DEF is N,N'-diethylformamide.

Figure 1:
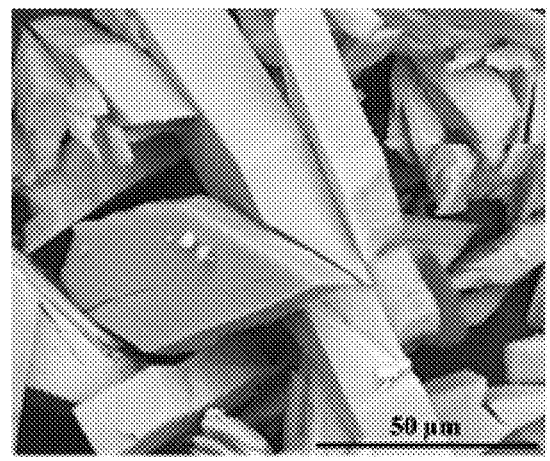
FIG. 1 is a SEM image of a single crystal of SMOF-7.

FIG. 1 is a SEM image of a single crystal of SMOF-7 synthesized in EXAMPLE 1, below. As can be seen in FIG. 1, the material crystallizes as large single crystals with plate-like morphology.

Figure 2:
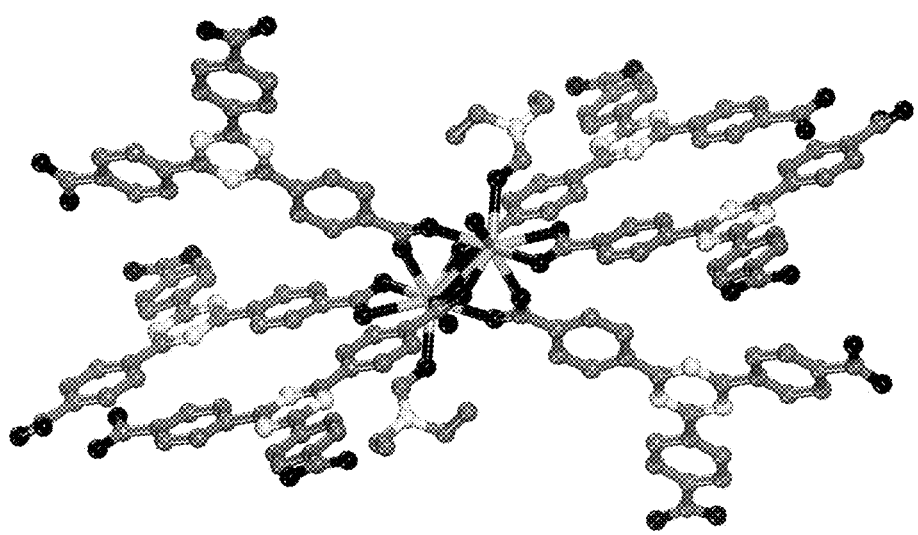
FIG. 2 is a ball-and-stick representation of the Eu-dimetal cluster molecular building block.

FIG. 2 is a ball-and-stick representation of the Eu-dimetal cluster molecular building block. As can be seen in FIG. 2, the Eu dimetal cluster is bridged by 6 TTB ligands: two bind in a chelate-bidentate mode, another two in a bridging bidentate fashion, while the remaining two adopt a bridging chelate-bidentate mode. Within this cluster, each Eu metal center has a 9-coordinate tricapped trigonal prismatic geometry: eight of the available sites are coordinated by 4 independent TTB organic ligands, while the remaining coordination sphere is completed by one water and one DEF molecule per Eu metal center.

Figure 3:
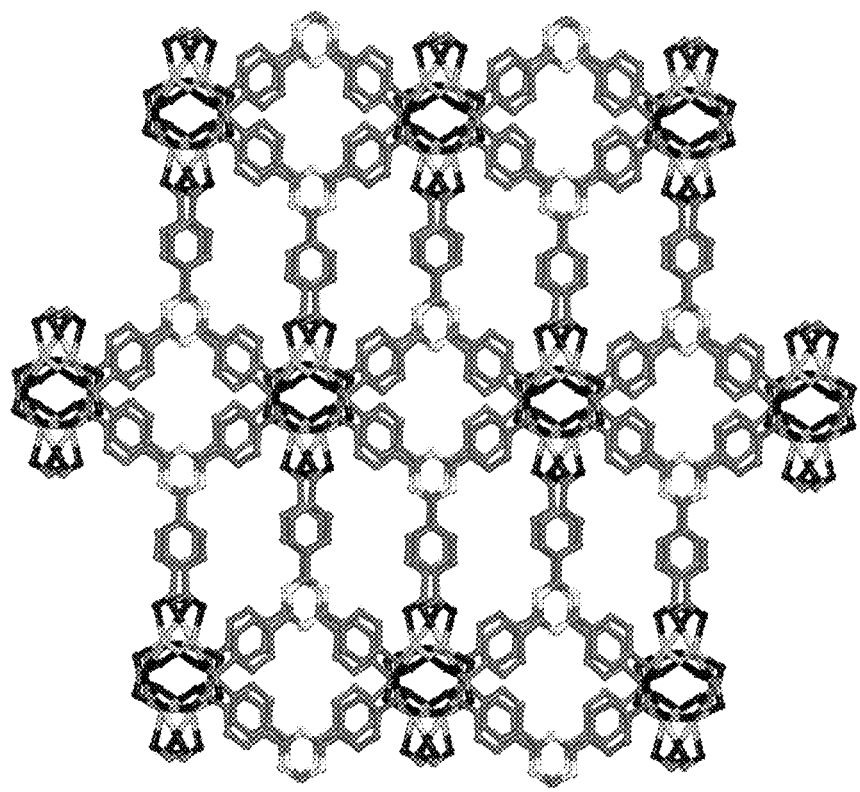
FIG. 3 is a view of the framework in SMOF-7. Hydrogen atoms have been omitted for clarity. Atom color scheme: Eu=lighter gray; N=white; C=darker gray; and O=black.

FIG. 3 is a view of the framework in SMOF-7. Hydrogen atoms have been omitted for clarity. Atom color scheme: Eu=lighter gray; N=white; C=darker gray; and O=black As can be seen in FIG. 3, the dimetal clusters assemble to yield an extended three dimensional framework.

Figure 4:
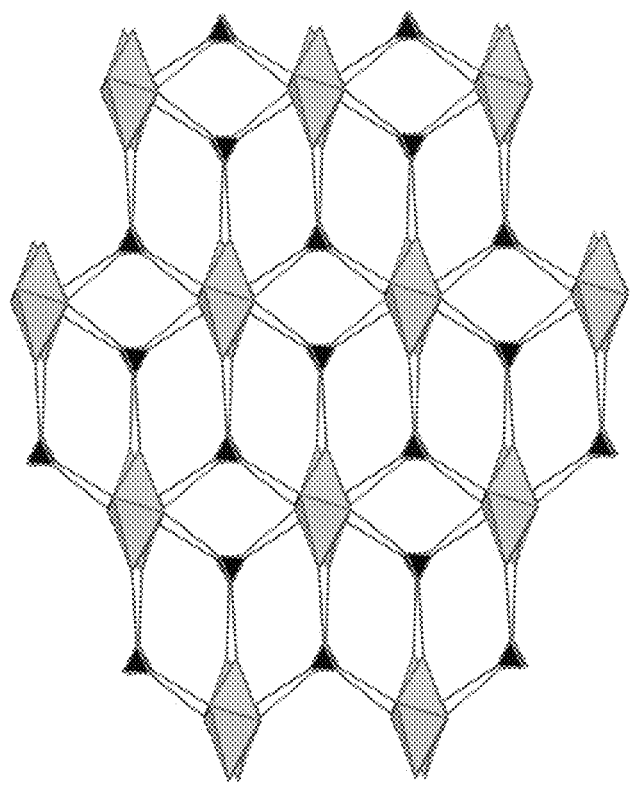
FIG. 4 illustrates novel (3,6)-connected net topography in SMOF-7. The dimetal cluster is represented as octahedral node (grey), whereas the TTB linker is simplified as a 3-connected node (black).

FIG. 4 illustrates novel (3,6)-connected net topography in SMOF-7. As can be seen in FIG. 4, this topology has not been previously observed in any materials to date. The dimetal cluster is represented as octahedral node (grey), whereas the TTB linker is simplified as a 3-connected node (black). The short Schläfli (point) symbol for the net is $\{4.8^2\}2\{4^2.8^{12}.10\}$.

Figure 5:
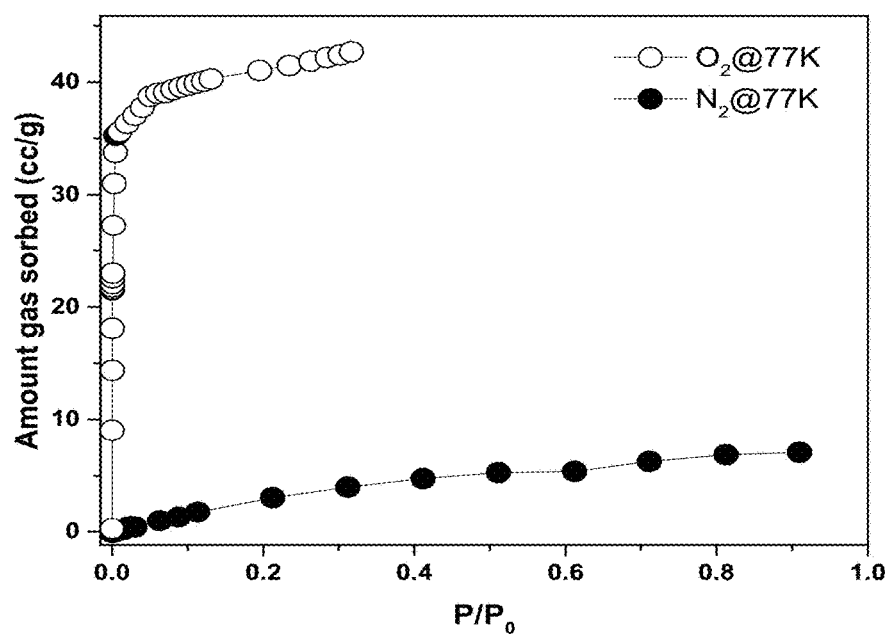
FIG. 5 shows $O_2$ vs. $N_2$ sorption isotherm measured at 77 K in SMOF-7.
Figure 6A:
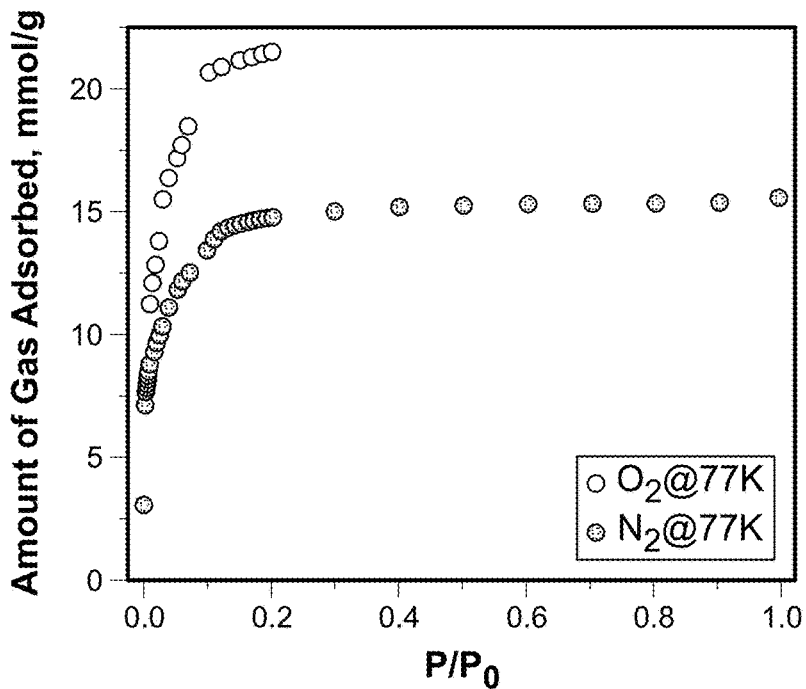
FIG. 6A shows $O_2$ and $N_2$ adsorption isotherms on Sc-MIL-100 measured at 77 K.
Figure 6B:
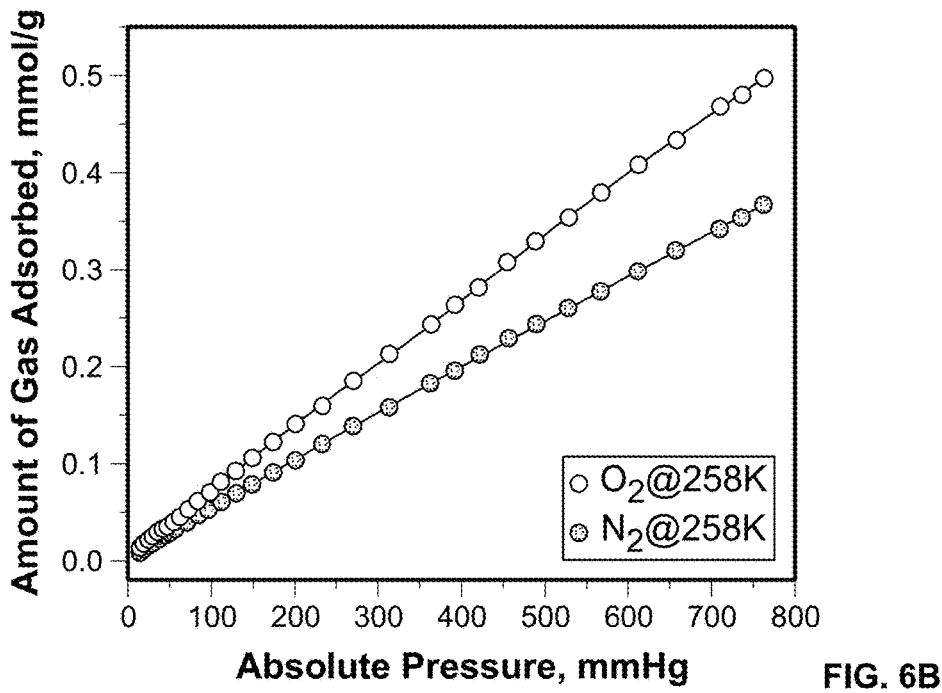
FIG. 6B shows $O_2$ and $N_2$ adsorption isotherms on Sc-MIL-100 measured at 258 K.
Figure 6C:
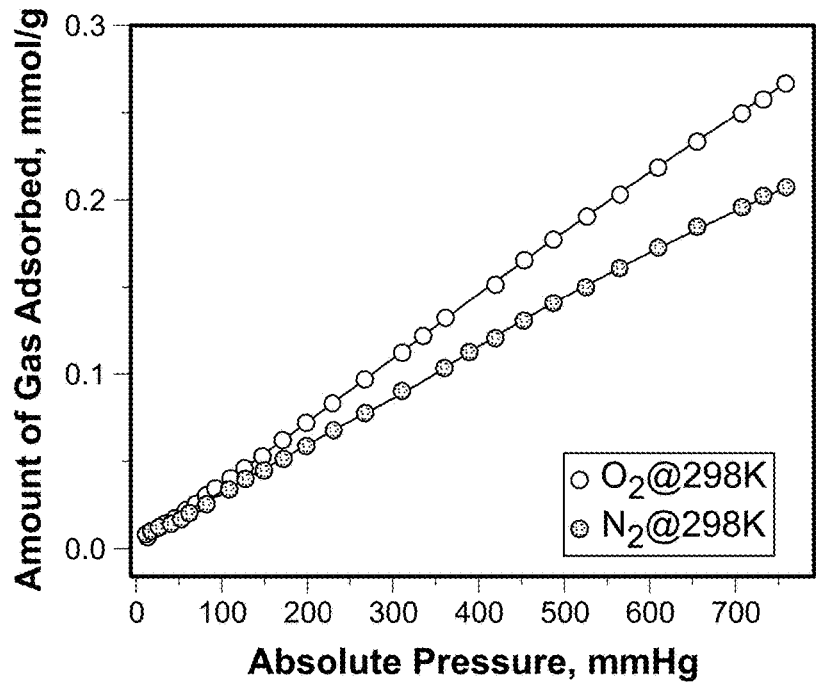
FIG. 6C shows $O_2$ and $N_2$ adsorption isotherms on Sc-MIL-100 measured at 298 K.
Figure 6D:
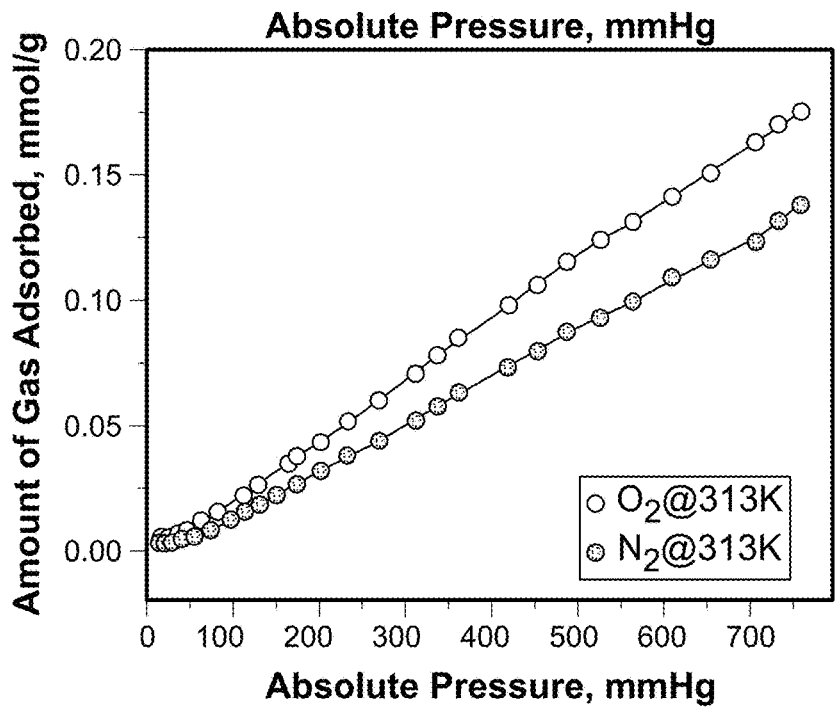
FIG. 6D shows $O_2$ and $N_2$ adsorption isotherms on Sc-MIL-100 measured at 313 K.
Figure 6E:
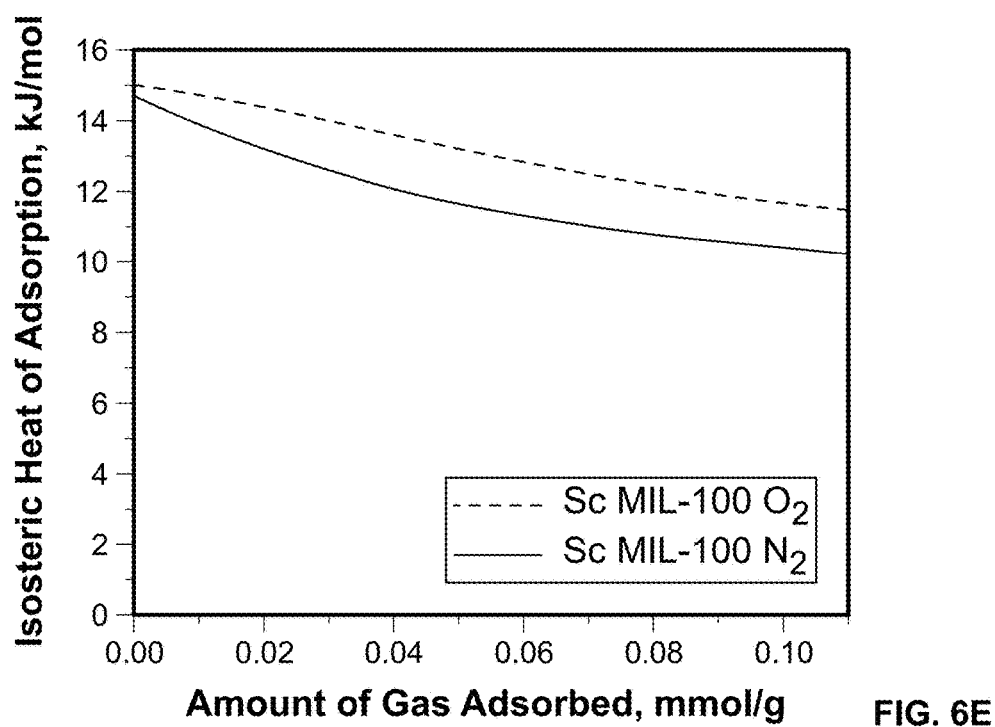
FIG. 6E shows $O_2$ and $N_2$ heats of adsorption derived from independently fitted virial isotherms at 258 K, 298 K, and 313 K, for the Sc-MIL-100 sample.

FIG. 5 shows $O_2$ vs. $N_2$ sorption isotherm measured at 77 K in SMOF-7. As can be seen in FIG. 5, the SMOF-7 framework preferentially adsorbs $O_2$ over $N_2$ at 77 K and up to 0.3 atm, with a separation value of 10.2.

SMOF-7 is synthesized by suspending a reaction mixture containing an Eu metal salt and a tritopic organic ligand in an organic solvent mixture and heating the mixture to produce a crystalline phase with plate-like morphology.

In an embodiment, SMOF-7 may be synthesized by mixing 1:3 or 1:2 molar ratio of the Eu:TTB amounts of $EuCl_3 \cdot 6H_2O$ and TTB (4,4',4'-s-triazine-2,4,6-triyl-tribenzoic acid) ligand in a solvent mixture of DMF (N,N-diethylformamide) and EtOH, capped and heated at 115° C.

for 1 day. The activated (desolvated) version of this phase has an $O_2/N_2$ separation value of 10.2 at 77 K at 0.3 atm.

Example 1, Synthesis of SMOF-7

SMOF-7 was synthesized by forming a reaction mixture containing $EuCl_3$-6H2O (0.021 mmol, 8 mg), 4,4',4''-s-triazine-2,4,6-triyl-tribenzoic acid, (TTB) (0.043 mmol, 19 mg), N,N'-diethylformamide (DEF) (2 mL), and EtOH (3 mL) in a 20 mL scintillation vial. The vial was heated to 115° C. for 1 day at a rate of 1.5° C./min and cooled to room temperature at a cooling rate of 1° C./min. Plate-like crystalline SMOF-7 material was obtained.

Technoeconomic analysis shows SMOF-7 exhibits preference for $O_2$ over $N_2$ at 77K and had better predicted performance than common oxyfuel process zeolites (see Table 1).

TABLE 1

Performance of SNL SMOF-7 adsorbent and published performance of zeolites (5A, CaX) for air separation.

| Metric | Zeolites* | SMOF-7 |
|---|---|---|
| Adsorption capacity (Saturation constant) | 1.2,1.4 mol/kg | 1.78 mol/kg |
| Selectivity (Separation factor) | 4.1, 11.2 | 10.2 |
| Energy to produce 1 kg O2 using PSA | 0.28 kWh | ~0.15 kWh |

*5A = $Na_{12}[(AlO_2)_{12}(SiO_2)_{12}]$ • 27H$_2$O [3], CaX = $(Ca_{44})Si_{104}Al_{88}O_{384}$ or if hydrated $(Ca_{44})(H_2O_{220})Si_{104}Al_{88}O_{384}$ Partially Substituted Cu-BTC (m/Cu-BTC).

Cu-BTC is a known MOF. Cu-BTC is a high surface area MOF (1500-2000 $m^2/g$) that consists of diatomic copper centers linked by 1,3,5-benzenetricarboxylate units. Unsaturated meal centers (UMCs) are accessible in the apical positions of the dimetal paddle wheel upon removal of coordinated water with heat and vacuum.

According to an embodiment of the present disclosure, Cu-BTC is partially substituted by one or more metals selected from a group including Sc, Ti, V, Mn, Fe and Co for the Cu metal. Partially substituted Cu-BTVC (m/Cu-BTC) has a stronger binding affinity to $O_2$ as compared to Cu-BTC.

m/Cu-BTC (m=Sc, Ti, V, Mn, Fe and Co) is formed by adding a previously synthesized Cu-BTC to a stock solution of a substitute metal of interest in an organic solvent, and heated to produce a partially-exchanged or partially substituted or mixed metal m/Cu-BTC.

Examples

Homogeneous substitution of Mn, Fe, and Co at various levels into Cu-BTC were made to determine the performance of Mn and Co partial substitutions compared to Fe, and the effect of those substitutions on preferential gas sorption were determined. Using a combination of density functional theory (DFT) calculations, postsynthetic metal substitutions, materials characterization, and gas sorption testing, it was demonstrate that the identity of the metal ion has a quantifiable effect on their oxygen and nitrogen sorption properties at cryogenic temperatures. An excellent correlation is found between $O_2/N_2$ selectivities determined experimentally at 77 K and the difference in $O_2$ and $N_2$ binding energies calculated from DFT modeling data: Mn>Fe≈Co>>Cu. Room temperature gas sorption studies were also performed and correlated with metal substitution. The Fe exchanged sample shows a significantly higher nitrogen isosteric heat of adsorption at temperatures close to ambient conditions (273-298 K) as compared to all other metals studied, indicative of favorable interactions between $N_2$ and coordinatively unsaturated Fe metal centers. Interestingly, differences in gas adsorption results at cryogenic and room temperatures are evident; they are explained by comparing experimental results with DFT binding energies (0 K) and room temperature Grand Canonical Monte Carlo (GCMC) simulations. Even more improved $O_2$ selectivity is shown for Sc, Ti and V partially substituted Cu-BTC.

Example 2, Synthesis of Mn-Exchanged Cu-BTC (Mn/Cu-BTC)

MnCl2-4H2O (0.098 g, 0.5 mmol) was dissolved in 3 Ml of N,N'-dimethylformamide (DMF). This solution was added to a solid sample of pristine Cu-BTC (0.045 g, 0.2 mmol) and was heated to 90° C. in a convection oven at a rate of 1.5° C./min, held at 90° C. for 1 day, and then cooled to room temperature at a cooling rate of 1° C./min. The solvent was decanted, and the solid was washed with 5×10 mL of DMF.

Example 3, Synthesis of Fe-Exchanged Cu-BTC (Fe/Cu-BTC)

$FeCl_2$-$4H_2O$ (0.045 g, 0.2 mmol) was dissolved in 3 mL of DMF. This solution was added to the pristine Cu-BTC (0.045 g, 0.2 mmol) and was heated to 90° C. in a convection oven at a rate of 1.5° C./min, held at 90° C. for 1 day, and then cooled to room temperature at a cooling rate of 1° C./min. The solvent was decanted and the solid was washed with 5×10 mL of DMF.

Example 4, Synthesis of Co-Exchanged Cu-BTC (Co/Cu-BTC)

$CoCl_2$.$6H_2O$ (0.117 g, 0.5 mmol) was dissolved in 3 mL of DMF. This solution was added to the pristine Cu-BTC (0.045 g, 0.2 mmol), heated to 90° C. in a convection oven at a rate of 1.5° C./min, held at 90° C. for 1 day, and then cooled to room temperature at a cooling rate of 1° C./min. The solvent was decanted, and the solid was washed with 5×10 mL of DMF.

Sample Activation for Examples 2, 3 and 4 and Gas Adsorption Measurements.

Prior to measuring the gas adsorption isotherms, all samples were activated to generated porosity. The samples were activated by soaking in 15 mL of ethanol for 3 days, with the solvent replenished every 24 h. Subsequently, the samples were activated under a vacuum on a Micromeritics ASAP 2020 surface area and porosity analyzer, at 473 K for 10 h.

Gas adsorption isotherms were measured using a Micromeritics ASAP 2020 surface area and porosity analyzer. Nitrogen and oxygen gas of ultrahigh purity (99.999%, obtained from Matheson Tri-Gas) were used in these experiments. Gas adsorption isotherms at 77 K were measured in a liquid nitrogen dewar. Nitrogen and oxygen adsorption isotherms at 273, 283, and 298 K were measured in a dewar connected to a Polyscience circulating isothermal bath with an advanced digital temperature controller. Oxygen adsorption isotherms at 77 K were measured up to ~0.2 P/PO, since the saturation vapor pressure of $O_2$ at 77 K is 147.8 mmHg.

In the Examples above, the samples are porous, and the Langmuir surface areas were found to be 1586 $m^2/g$ for Co/Cu-BTC, 1773 $m^2/g$ for Fe/Cu-BTC and 1791 $m^2/g$ for Mn/Cu-BTC, which are all slightly lower than the Langmuir surface area for Cu-BTC, 2237 $m^2/g$.

$O_2$ Sorption Processes

As discussed above, the disclosure is further directed to new $O_2$ sorption processes. In an embodiment, the processes may use SMOF-7 and newly disclosed, partially substituted and activated m/Cu-BTC (m=Sc, Ti, V, Mn, Fe and Co), including Mn/Cu-BTC, Fe/Cu-BTC Co/Cu-BTC, Sc/Cu-BTC, V/Cu-BTC and Ti/Cu-BTC to separate and release $O_2$ from a gas stream containing $O_2$.

In another embodiment, the processes may use m-MIL-100, where m=Sc, Ti and V. m-MIL-100 is a large pored MOF which can be synthesized directly from reactants in different analogs by choosing different transition metals salts as the metal center. m-MIL-100 is metal-(1,3,5-BTC); BTC=Benzene-1,3,5-tricarboxylic acid; $C_6H_3(CO_2H)_3$; where m=Sc, Ti and V.

The MIL-100 framework is constructed from oxo-centered metal trimers linked by benzenetricarboxylate (btc) ligands, forming tetrahedral cages, referred to as "supertetrahedra". Corner-sharing of the supertetrahedral building blocks defines a highly porous structure with two types of mesoporous cages of 25 Å and 29 Å in diameter, accessible through pentagonal windows of 5.5 Å and hexagonal windows of ~8.6 Å. The compositions have the general formula: metal-(1,3,5-BTC); BTC=Benzene-1,3,5-tricarboxylic acid; $C_6H_3(CO_2H)_3$, where metal is selected from the group consisting of Sc, Ti and V.

m-MIL-100 materials exhibit preferential oxygen sorption over nitrogen at temperatures from 77K-313 K. According to this disclosure, it is submitted that the use of Sc, Ti and V in m-MIL-100 is shown to have unexpectedly higher selectivity at lower temperatures compared to other MOF materials. This allows for the use of these MOFs at/near ambient conditions for the selective removal of $O_2$ from air in such applications as, but not limited to medical production of $O_2$, on board oxygen-generating systems, and oxyfuel combustion (high temperature furnace applications).

In an embodiment, m-MIL-100 is Sc-MIL-100. Synthesis and gas sorption testing of Sc-MIL-100 shows that Sc-MIL-100 exhibits high selectivity and capacity for $O_2$ over $N_2$ from 77 K through 313 K. Furthermore, it has higher selectivity and capacity than a commercially available Fe-MIL-100 analog.

Example 4, Synthesis of Sc-MIL-100

A mixture of $Sc(NO_3)_3 \cdot xH_2O$ (0.02 g, 0.087 mmol) and 1,3,5-benzenetricarboxylic acid (1,3,5-BTC, 0.018 g, 0.087 mmol) was dissolved in 3 mL of N,N'-dimethylformamide (DMF) and concentrated HCl (37.0%, 1 drop). The solution was heated in a scintillation vial to 373 K in a convection oven at a rate of 1.5 K/min, held at 373 K for 18 hours, and then cooled to room temperature at a cooling rate of 1 K/minute. The solvent was decanted and the solid was washed with 5×10 mL of DMF. The purity of the as synthesized compound was confirmed by powder X-ray diffraction.

Experimental $O_2$ and $N_2$ gas sorption were obtained for Sc-MIL-100 over a wide temperature range of 77, 258, 298, and 313 K, see FIGS. 6A-6D. The dashed line in FIGS. 6A-6D represents the independent fit to the experimental data for each temperature using a modified virial equation. The adsorption isotherms were measured on desolvated samples at 453 K for 12 hours. The Langmuir surface area for the Sc-MIL-100 was calculated to be 1635 $m^2/g$ and is on par with previous reports. As predicted by GCMC simulations results, experiments show that $O_2$ is more favorably adsorbed than $N_2$ at all temperatures studied. At 77 K, the Sc metal center has enhanced interactions with $O_2$ and results in higher loadings over $N_2$. This finding is consistent with our previous results on pristine and metal exchanged Cu-BTC materials, also consisting of uncoordinated metal centers. This trend is maintained at 258, 298, and 313 K, temperatures relevant to energy efficient oxygen purification processes, such as PSA.

Importantly, the structural integrity of the sample is preserved after gas adsorption at these elevated temperatures, as evidenced by post analyses XRD. Sc-MIL-100 is one of the few examples of MOF maintaining both its structural integrity and a higher $O_2$ than $N_2$ capacity at temperatures well above room temperature. Apparently, the uncoordinated-metal center is not directly accessible in the 258 K-313 K range, but presumably it still plays a role in preferred $O_2$ vs $N_2$ adsorption, possibly from the puckered geometry of the oxo-centered metal trimer. One explanation is expanded opening into the tetrahedral cage due to the cupping of the trimer from an out of plane oxygen displacement.

Isosteric heat of adsorption, Qst, provides important information regarding the energetics between the adsorbed gas ($O_2$ or $N_2$) and the Sc-MIL-100 framework. In order to calculate the Qst, each isotherm was independently fitted using a modified virial equation represented as a dashed line in FIGUREES 6B-6D. Stronger binding affinities are calculated for $O_2$=15.1 kJ/mol versus $N_2$=14.7 kJ/mol.

Figure 7A:
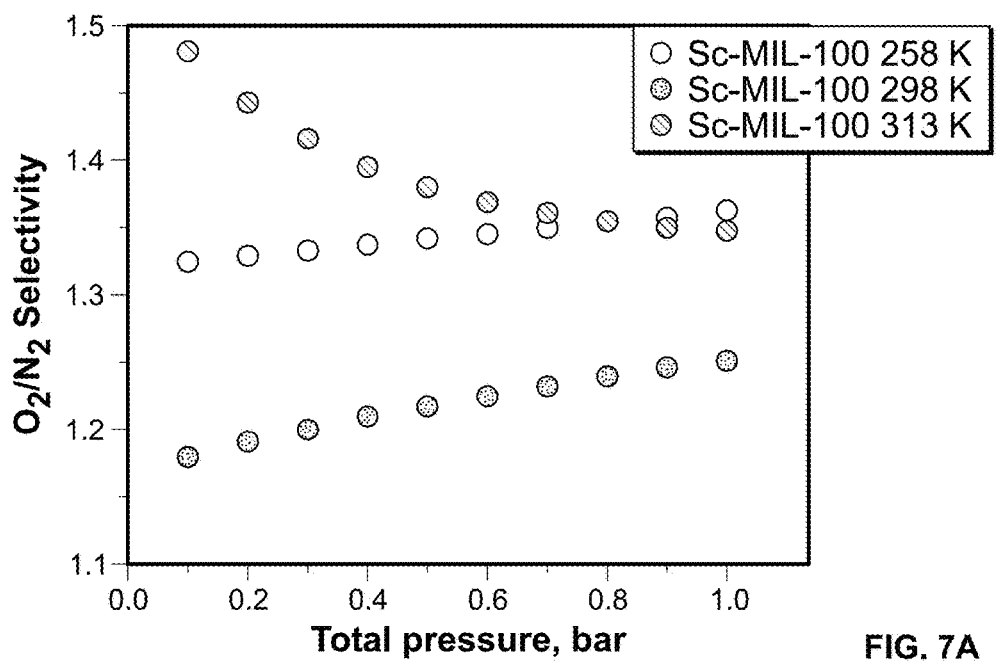
FIG. 7A shows calculated (IAST) $O_2/N_2$ selectivity for a 20:80 $O_2/N_2$ mixture from Sc-MIL-100 experimental isotherms measured at 258, 298, and 313 K. (b)
Figure 7B:
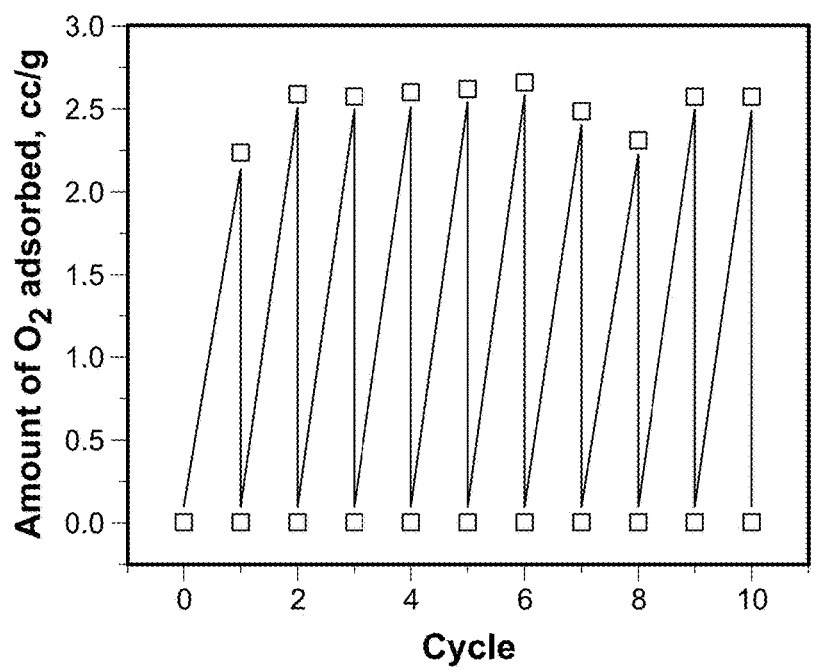
FIG. 7B shows $O_2$ adsorption and desorption in Sc-MIL-100 over 10 cycles at 298 K and 1 atm.

To assess the $O_2/N_2$ selectivity in conditions relevant to air separations, a 20:80 mixture of $O_2:N_2$ was analyzed for feed pressures of 0.1-1.0 bar, using the Ideal Adsorbed Solution Theory (IAST) for both experimental (see FIG. 7A) and GCMC isotherms. FIG. 7A shows calculated (IAST) $O_2/N_2$ selectivity for a 20:80 $O_2/N_2$ mixture from Sc-MIL-100 experimental isotherms measured at 258, 298, and 313 K. (b) FIG. 7B shows $O_2$ adsorption and desorption in Sc-MIL-100 over 10 cycles at 298 K and 1 atm. Results indicate there is little variation in the $O_2/N_2$ selectivity with total pressure. Importantly, the highest separation values are observed at 313K, $O_2/N_2$=1.5 suggesting great promise for increased energy efficiency via realistic separation processes that do not rely on cryogenic cooling, Further, the cycling performance of the Sc-MIL-100 sample was assessed at 298 K and 1 atm, see FIG. 7B. 10 consecutive adsorption-desorption cycles were tested, with no additional degassing in between events. No measurable loss to the $O_2$ adsorption capacity is noted over the range studied.

As a comparison to the Sc-MIL-100 sample, the $O_2$ and $N_2$ adsorption isotherms were measured on a desolvated Fe-MIL-100 sample at 423 K for 6 hours at 77, 258, 298, and 313 K, see FIG. 8A-8D.

The Langmuir surface area was calculated from the nitrogen adsorption isotherm at 77 K and was found to be 1900 $m^2/g$. This value is comparable to the surface area reported in the technical note by the commercial source (2120 m2/g) though slightly lower than the one originally reported by Horcajada et al. in Horcajada, P.; Surble, S.; Serre, C.; Hong, D.-Y.; Seo, Y.-K.; Chang, J.-S.; Greneche, J.-M.; Margiolaki, I.; Ferey, G. Synthesis and Catalytic Properties of MIL-100(Fe), an Iron(III) Carboxylate with Large Pores. Chem. Commun. 2007, 2820-2822. These discrepancies might be related to distinct synthesis methods (the Fe-MIL-100 studied here was based on a fluorine-free synthesis) and/or incomplete pore evacuation.

At 77 K, $O_2$ is more favorably adsorbed over $N_2$. At 258 K, Fe-MIL-100 adsorbs slightly more $N_2$ than $O_2$, FIG. 8B. However, this is reversed again as the temperature increases closer to ambient conditions, with $O_2$ being adsorbed ~20% more than $N_2$ at 298 K, FIG. 8c. At 313 K, the amount of adsorbed $O_2$ increases even more, ~35% more than $N_2$, see FIG. 8D.

Figure 8A:
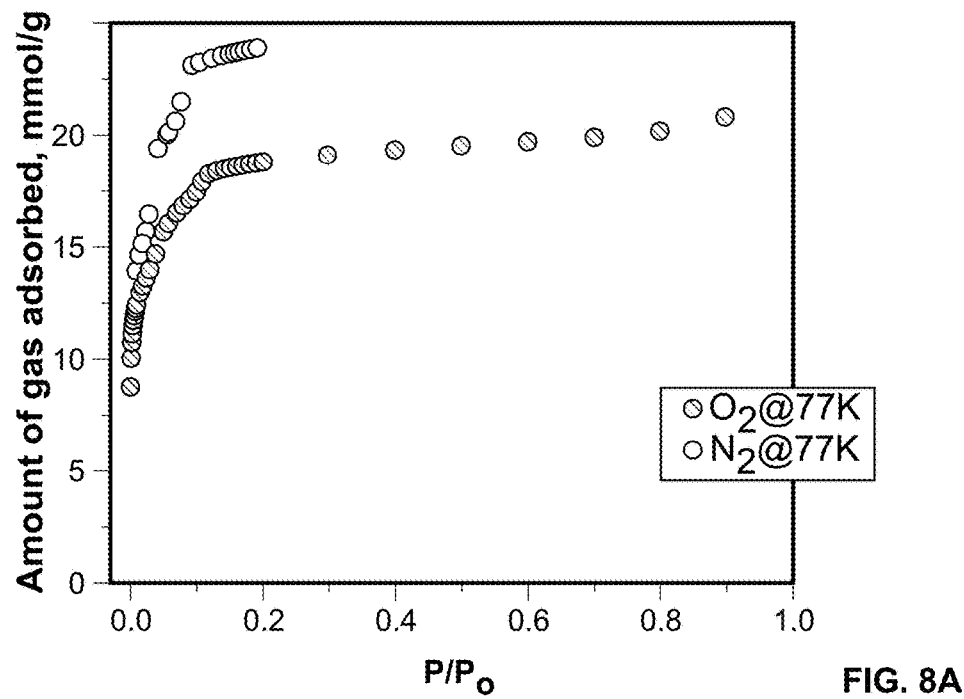
FIG. 8A shows $O_2$ and $N_2$ adsorption isotherms on Fe-MIL-100 measured at 77 K.
Figure 8B:
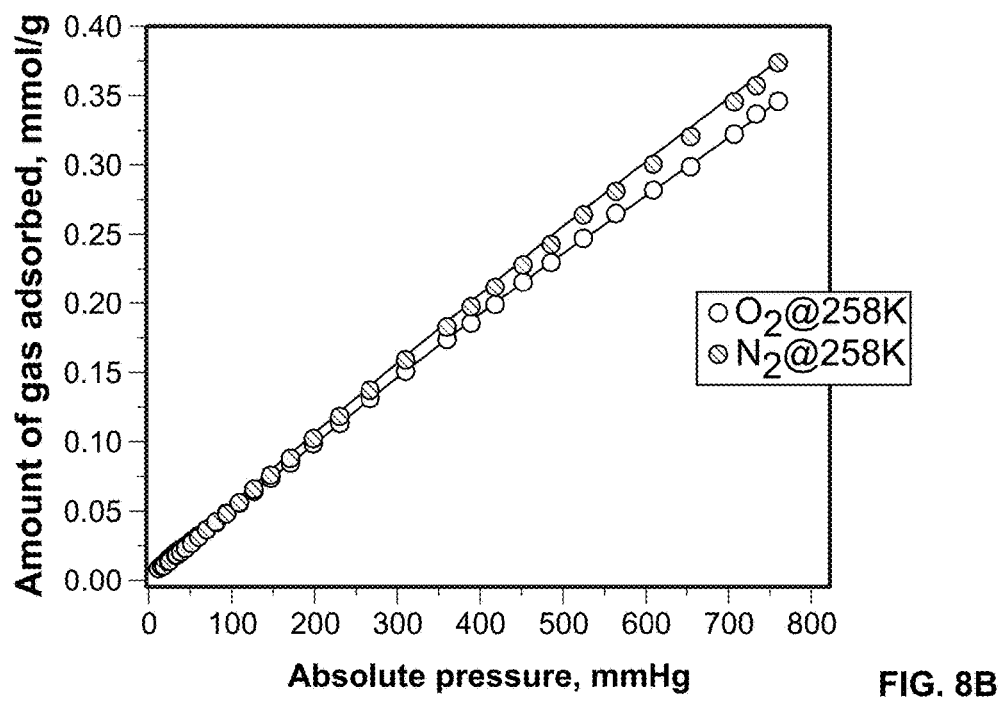
FIG. 8B shows $O_2$ and $N_2$ adsorption isotherms on Fe-MIL-100 measured at 258 K (the dashed line represents the independent fit to the experimental data for each temperature using a modified virial equation).
Figure 8C:
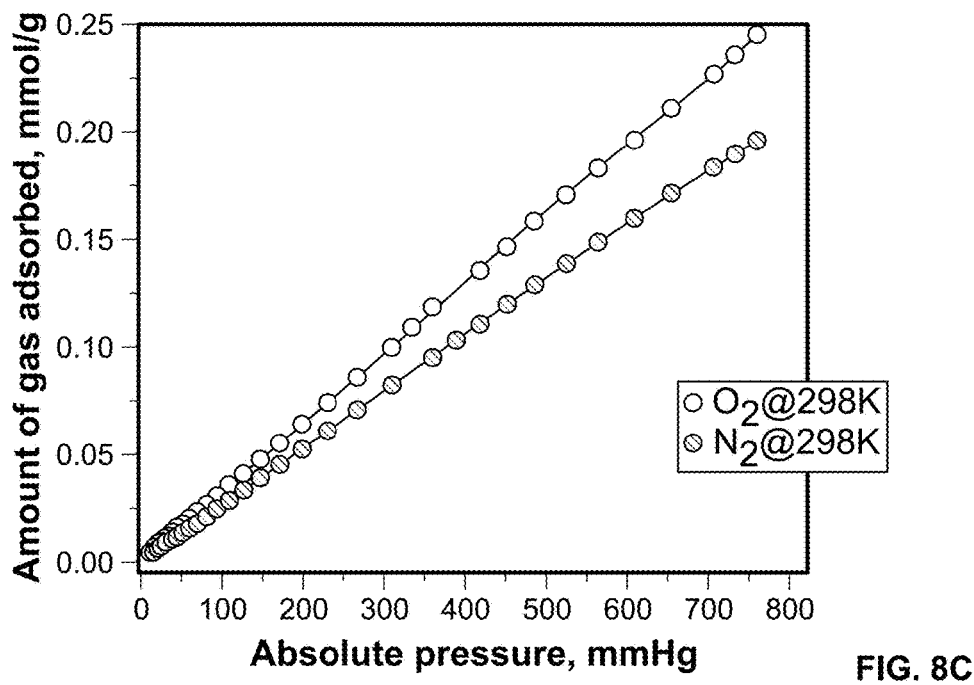
FIG. 8C shows $O_2$ and $N_2$ adsorption isotherms on Fe-MIL-100 measured at 298 K (the dashed line represents the independent fit to the experimental data for each temperature using a modified virial equation).
Figure 8D:
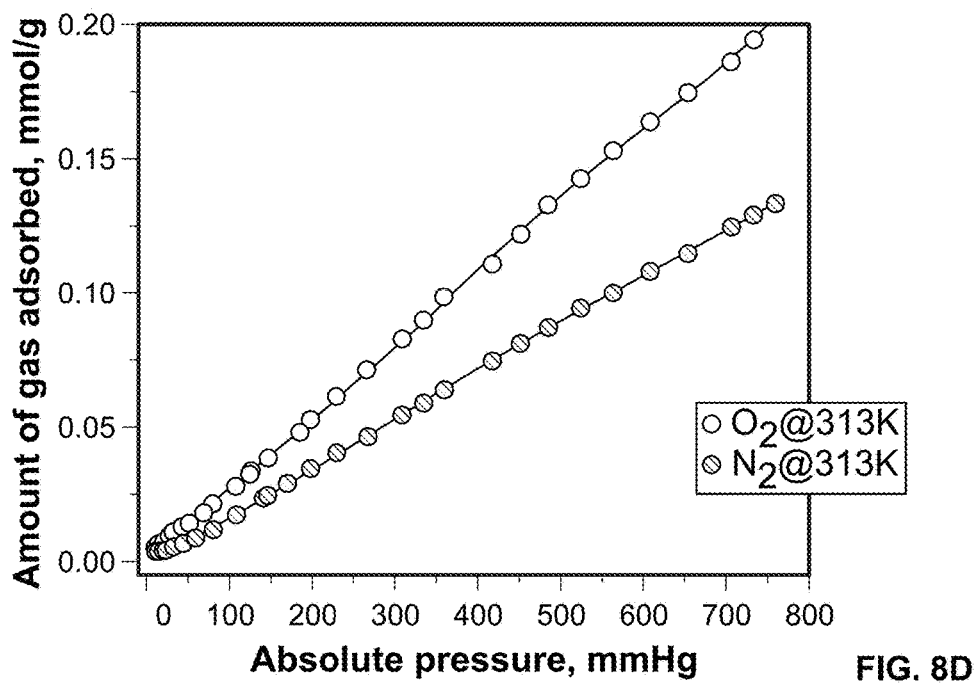
FIG. 8D shows $O_2$ and $N_2$ adsorption isotherms on Fe-MIL-100 measured at 313 K (the dashed line represents the independent fit to the experimental data for each temperature using a modified virial equation).
Figure 8E:
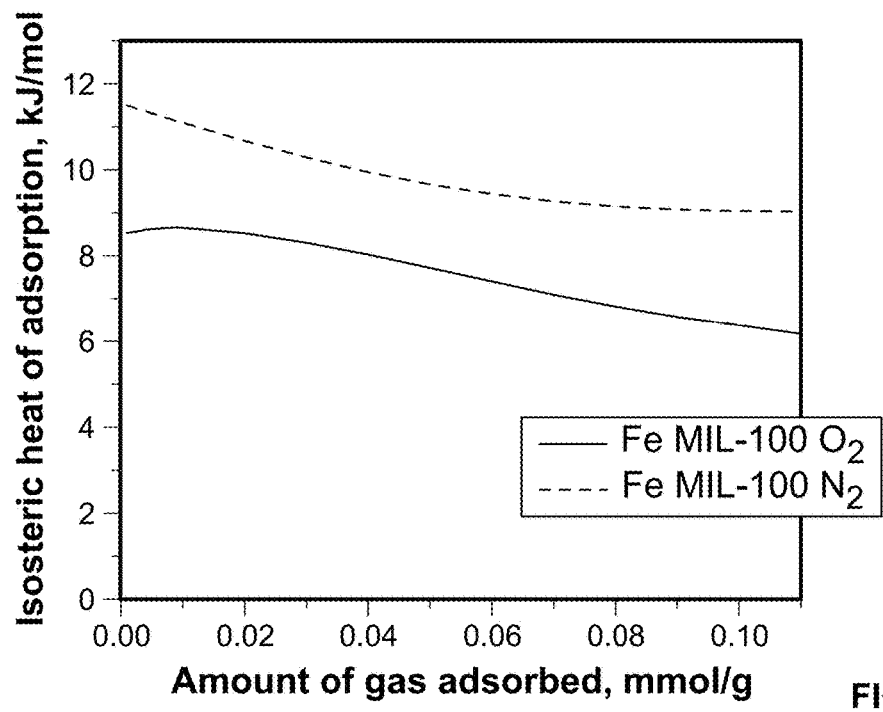
FIG. 8E shows $O_2$ and $N_2$ heats of adsorption derived from independently fitted virial isotherms at 258, 298, and 313 K, for a Fe-MIL-100 sample.

In the Fe-MIL-100 sample, binding affinities for $N_2$ are stronger than those for $O_2$, Qst for N2=11.5 kJ/mol versus $O_2$ b=8.5 kJ/mol, FIG. 8e. The explanation for this is a different adsorption mechanism and/or binding sites as compared to the Sc-MIL-100 sample. Similar to the Sc analogue, the Fe sample maintains structural integrity post testing at 313 K, as shown by powder XRD.

Figure 8F:
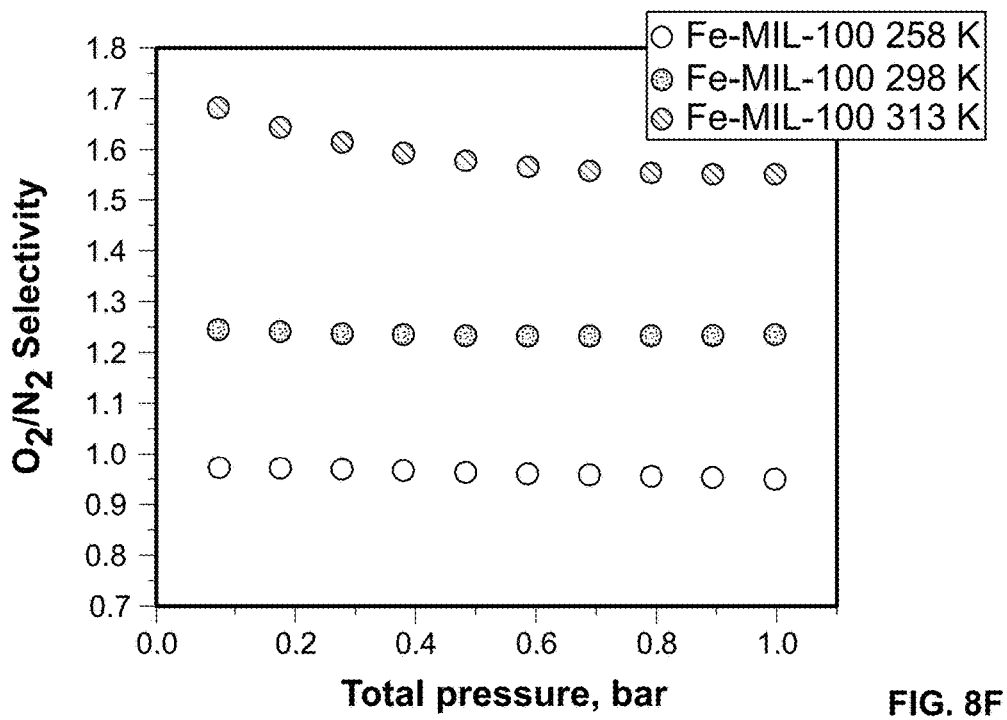
FIG. 8F shows calculated (IAST) $O_2/N_2$ selectivity for a 20:80 $O_2/N_2$ mixture from Fe-MIL-100 experimental isotherms measured at 258, 298, and 313 K.

The calculated IAST $O_2/N_2$ selectivity for the 20:80 $O_2:N_2$ mixture is constant along the entire pressure range up to 1 bar, FIG. 8f. Unique to this framework, the $O_2/N_2$ selectivity increases as the temperature increases: $O_2/N_2$~1 at 258 K, $O_2/N_2$=1.25 at 298 K, and reaching up to $O_2/N_2$=1.7 at 313 K.

As discussed above, the disclosed materials show high selectivity of $O_2$ at ambient (298 K) or near ambient temperature (near ambient being defined herein as +/−5K (293 K to 303 K). As appreciated by one of ordinary skill in the art, sorption improves as temperature decreases and pressure increases. Thus, at an initial adsorption temperature and pressure, desorption can be accomplished by either raising the temperature, decreasing the pressure, or a combination of both. In an embodiment, the sorption temperature may be between 77 K and 313 K, and the pressure range may be between 0.0001 atm and 1 atm. In an embodiment, the adsorption and desorption temperatures may be the same. Thus, for example, a PSA process according to an embodiment of the disclosure may operate at ambient or near ambient temperatures, thereby decreasing energy cost in oxygen separations by avoiding cryogenic crystallization of $O_2$ from air separations. Further in example, combustion processes can do separation at or near inlet gas feed temperature and pressure for combustion process.

The processes include contacting one or more of the materials discussed above with a gas stream containing $O_2$ to adsorb $O_2$ into the material. The material may be contained in a container, vessel or other enclosure that is part of a system using purified or concentrated oxygen, such as, but not limited to a a PSA system, a TSA system, a personal and portable medical oxygen supply system, an oxygen supply source for an oxyfuel combustion system, and an on board oxygen generator (OBOG) system.

The gas is contacted and adsorbed by the material at an adsorption pressure and temperature. The adsorption pressure is between 0.0001 atm and 10 atm. In an embodiment, the adsorption pressure is between 0.0001 atm and 1 atm. In another embodiment, the adsorption pressure is between 1 atm and 10 atm. In an embodiment, the adsorption and desorption pressures are the same. The adsorption temperature is between 77 K and 313 K. In an embodiment, the adsorption temperature is between 293 K and 303 K. In another embodiment, the adsorption temperature is ambient temperature.

Further according to the process, oxygen is released or desorbed from the material by lowering or decreasing the pressure to a desorption pressure. In an embodiment, the pressure at which desorption occurs may be the same as the adsorption pressure, or may be slightly higher or lower as would be appreciated by one of ordinary skill in the art.

The desorption pressure is between 0.0001 atm and 10 atm. In an embodiment, the desorption pressure is between 0.0001 atm and 1 atm. In another embodiment, the desorption pressure is between 1 atm and 10 atm. The desorption temperature is between 77 K and 313 K. In an embodiment, the desorption temperature is between 293 K and 303 K. In an embodiment, the desorption temperature is the same as the adsorption temperature. In another embodiment, the desorption temperature is ambient temperature.

The generated or released $O_2$ forms an oxygen supply stream that has an increased concentration of $O_2$ compared to the initial gas stream. In an embodiment, the oxygen supply stream has an $O_2$ concentration greater than 95%. In an embodiment, the oxygen supply stream has an $O_2$ concentration greater than 98%. In an embodiment, oxygen supply stream has an $O_2$ concentration greater than 99.99.

In an embodiment, these materials may be used in pressure swing adsorption (PSA) methods for separating $O_2$ from air or another oxygen containing gas streams.

The general operation or process steps of pressure swing adsorption methods are known, and need not be discussed in detail herein, as one of ordinary skill in the art would appreciated and understand incorporating the materials discussed above into such a process.

In another embodiment, the PSA process disclosed above may be used to generate $O_2$ in an oxyfuel combustion system and process. It is appreciated that the systems and processes of oxyfuel combustion are well known. In an embodiment, an oxyfuel combustion process according to an embodiment of the disclosure may operate at ambient or near ambient temperatures.

Oxygen-enriched combustion and full oxy-fuel combustion processes are well-known approaches to improve the heat transfer associated with stationary energy processes utilized by heavy industry or in power production. The addition of oxygen results in higher thermal efficiency, greater flame stability, improved ignition characteristics, greater burner turndown ratio, improved fuel flexibility, and reduced exhaust gas volumes, all stemming from the reduction or elimination of the $N_2$ component of air. In addition, $NO_x$ emissions can be nearly completely eliminated in oxy-fuel combustion. Finally, oxy-fuel combustion offers a lower-cost route to $CO_2$ capture, for either subsequent utilization (such as in enhanced oil recovery) or geologic sequestration. While the glass-melting industry, aluminum industry, and steel-making industry have adopted oxy-fuel combustion into some of their operations, its overall penetration into industrial and power markets is currently constrained by the high cost of existing air separation technologies for generating oxygen.

A major advantage of oxy-fuel combustion to thermal processes is through the much greater radiant emission from these flames. The radiant emission increases because of the higher flame temperatures associated with oxygen-enrichment (up to nearly 3000 K) and because the flame gases themselves have a much greater emissivity—absent the dilution from $N_2$ associated with traditional air-based combustion, the concentrations of radiantly active combustion products are 3.5 times larger in oxy-fuel flames. Careful tailoring of oxy-fuel flames allows the formation of enhanced soot levels within the flame, increasing thermal radiation (while still burning out soot and avoiding soot emissions). Radiation has been shown to cause 98% of the heat transfer from oxy-fuel flames to the 'batch' in glass-melting furnaces. Improvements in furnace efficiency when retrofitting air-fired furnaces to oxy-fired have ranged from 20-60% in glass and steel heating furnaces. The disclosed materials are the cutting edge materials needed for dramatic improvements to oxy-fuel combustion.

In another embodiment, the materials disclosed above may be used in on board oxygen generators (OBOGs). It is appreciated that the systems and processes of OBOGs are well known. In an embodiment, an on board oxygen generator process according to an embodiment of the disclosure may operate at ambient or near ambient temperatures.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A composition, comprising:
a metal-organic framework material capable of oxygen capture, the metal organic framework material consisting essentially of m/Cu-BTC, where BTC=benzene-1,3,5-tricarboxylic acid and m/Cu represents partial substitution of Cu with a metal ion (m) selected from a group consisting Sc, Ti, V, Mn, Fe and Co.

2. The composition of claim 1, wherein m is Sc.

3. A process, comprising:
contacting a gas stream containing oxygen at a first concentration with a metal-organic framework material having the formula m/Cu-BTC, where BTC=benzene-1,3,5-tricarboxylic acid and m/Cu represents partial substitution of Cu with a metal ion (m) selected from a group consisting Sc, Ti, V, Mn, Fe and Co at a first temperature and first pressure to adsorb oxygen from the gas stream into the metal-organic framework; and
desorbing oxygen from the metal-organic framework material at a second temperature and a second pressure.

4. The process of claim 3, wherein the first and second temperatures are equal.

5. The process of claim 3, wherein the second pressure is less than the first pressure.

6. The process of claim 3, wherein the second temperature is greater than the first temperature.

7. The process of claim 3, wherein the first temperature is ambient temperature.

* * * * *